No. 640,019. Patented Dec. 26, 1899.
E. H. PEARCE & A. GRIFFITHS.
GLASS BEVELING MACHINE.
(Application filed June 12, 1899.)
(No Model.) 6 Sheets—Sheet 1.
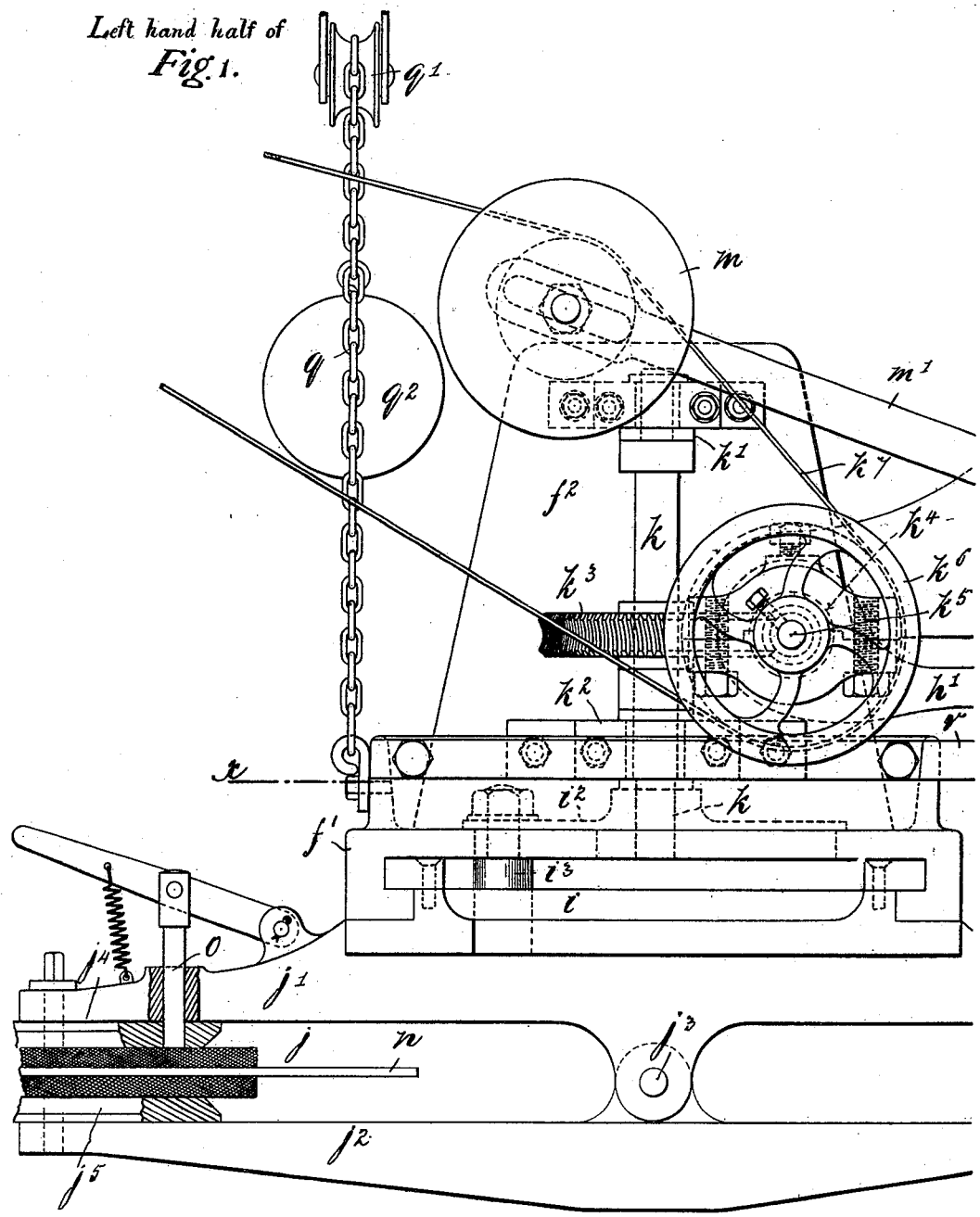
Left hand half of Fig. 1.
WITNESSES INVENTORS

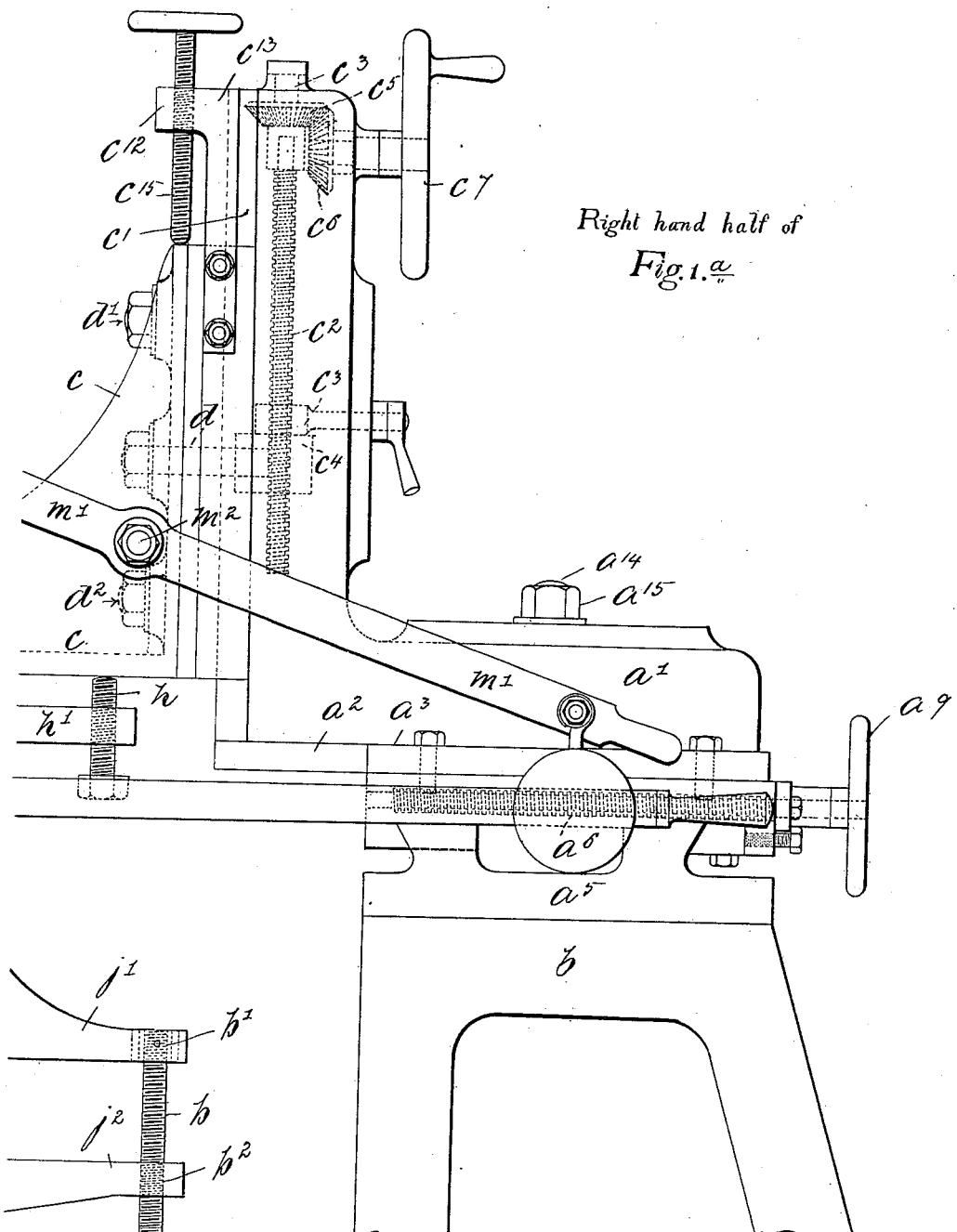

Left hand half of

No. 640,019. Patented Dec. 26, 1899.
E. H. PEARCE & A. GRIFFITHS.
GLASS BEVELING MACHINE.
(Application filed June 12, 1899.)

(No Model.) 6 Sheets—Sheet 4.

Right hand half of

WITNESSES

INVENTORS
Edward H. Pearce
Alfred Griffiths
by James L. Norris
Atty

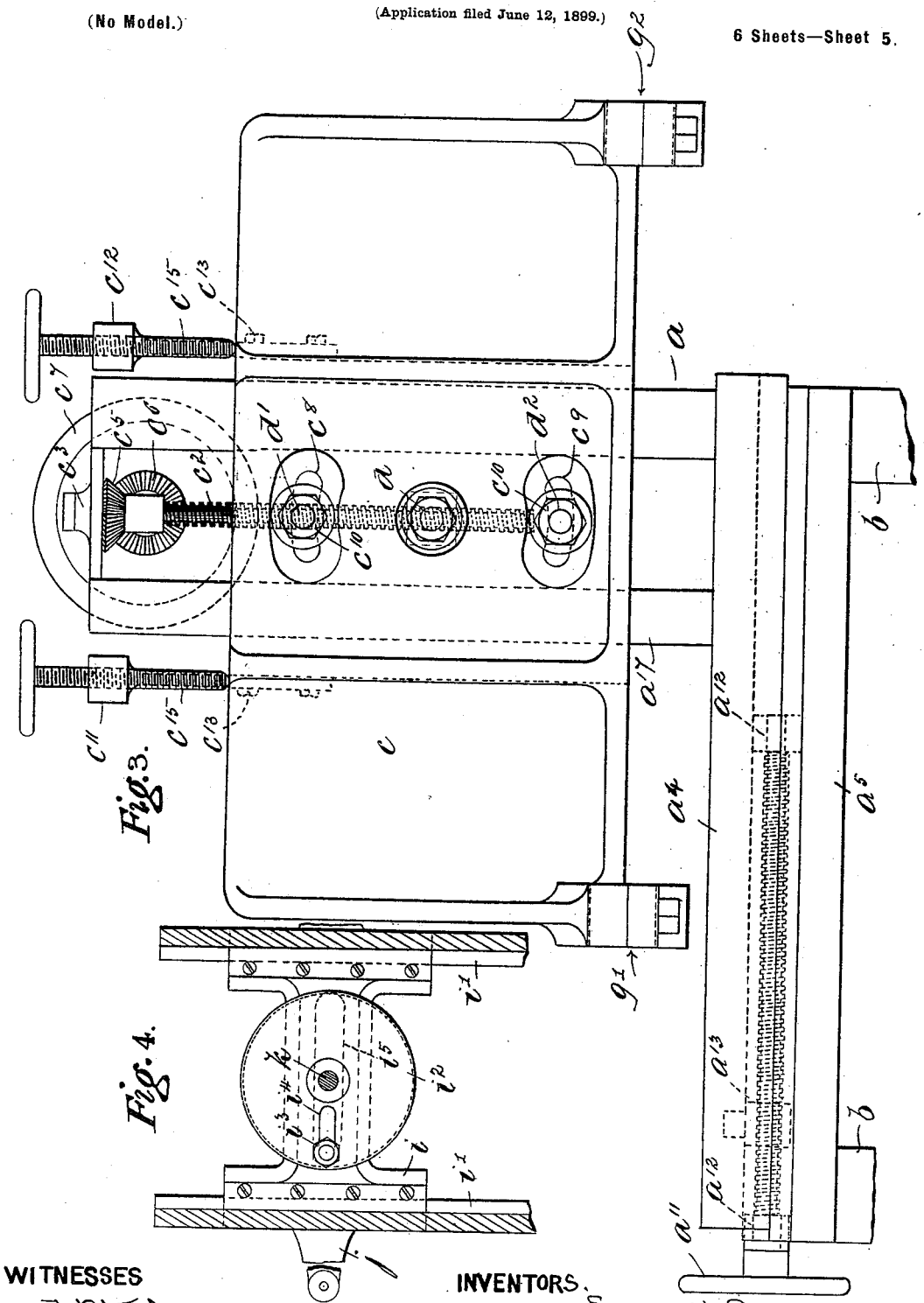

No. 640,019. Patented Dec. 26, 1899.
E. H. PEARCE & A. GRIFFITHS.
GLASS BEVELING MACHINE.
(Application filed June 12, 1899.)
(No Model.) 6 Sheets—Sheet 6.

Witnesses
H. C. Meyers.
Geo. N. Rea.

Inventors,
Edward H. Pearce
and Alfred Griffiths
By James L. Norris.
Attorney

UNITED STATES PATENT OFFICE.

EDWARD HENRY PEARCE AND ALFRED GRIFFITHS, OF BIRMINGHAM, ENGLAND.

GLASS-BEVELING MACHINE.

SPECIFICATION forming part of Letters Patent No. 640,019, dated December 26, 1899.

Application filed June 12, 1899. Serial No. 720,333. (No model.)

*To all whom it may concern:*

Be it known that we, EDWARD HENRY PEARCE, manufacturer, and ALFRED GRIFFITHS, foreman of works, subjects of the Queen of Great Britain, residing at Bridge street, in the city of Birmingham, England, have invented certain new and useful Improvements in Glass-Beveling Machines, of which the following is a specification.

This invention has relation to machinery to be used in the operations of beveling the edges of glass plates and of shaping such plates by grinding and also to the smoothing, polishing, and otherwise finishing the beveled or shaped surfaces.

The object of the invention is to provide improved means for holding or clamping the plates during the grinding or similar operations and for adjusting the clamps or holders in varying positions relative to the grinding stone, drum, or the like, according to the angle to which the edges of a plate are to be beveled or the outline shape which is to be given to a plate, and for giving a to-and-fro movement in a horizontal plane to the plate under treatment across the grinding-surface.

Figure 2:
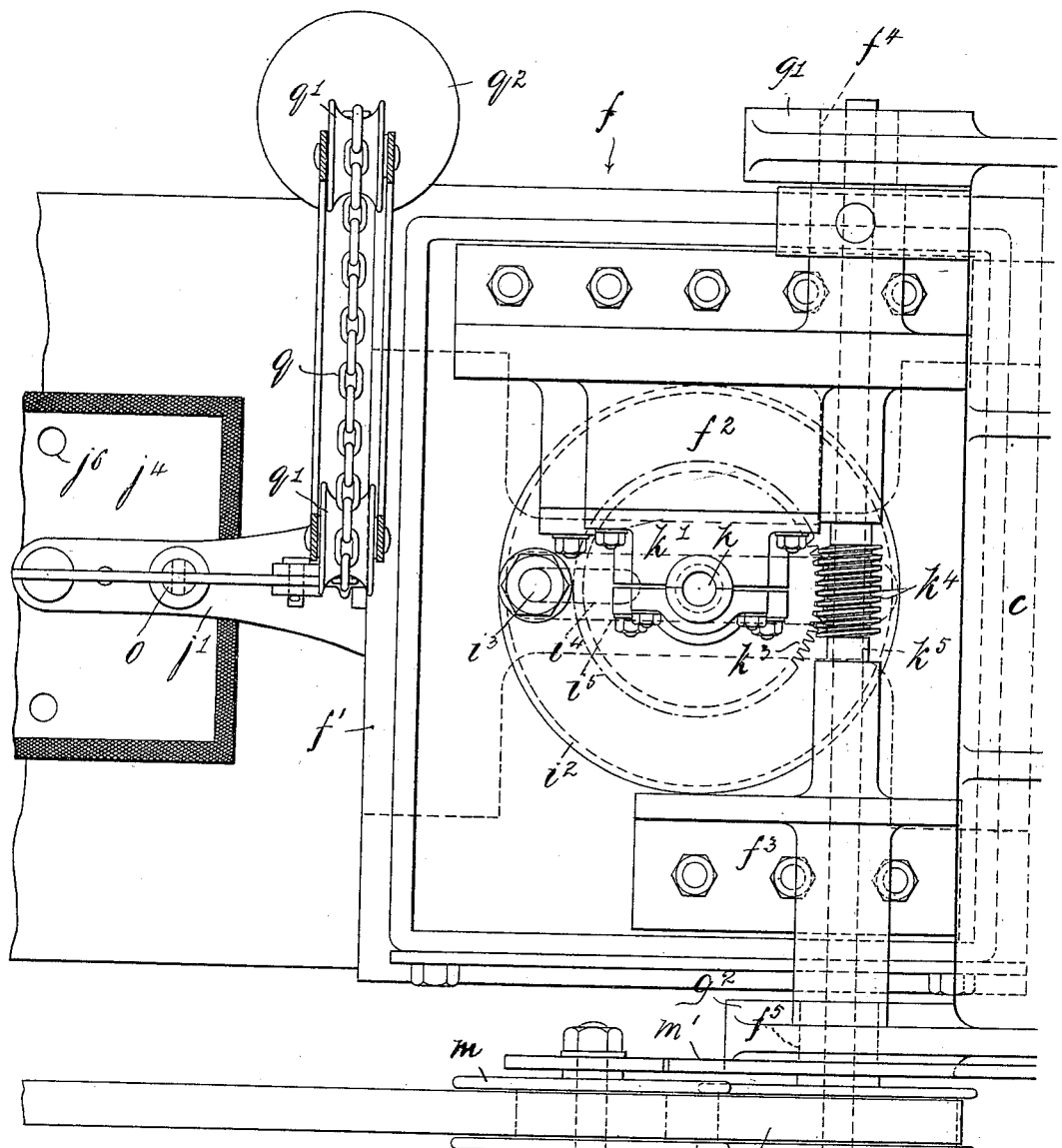
Figure 2:
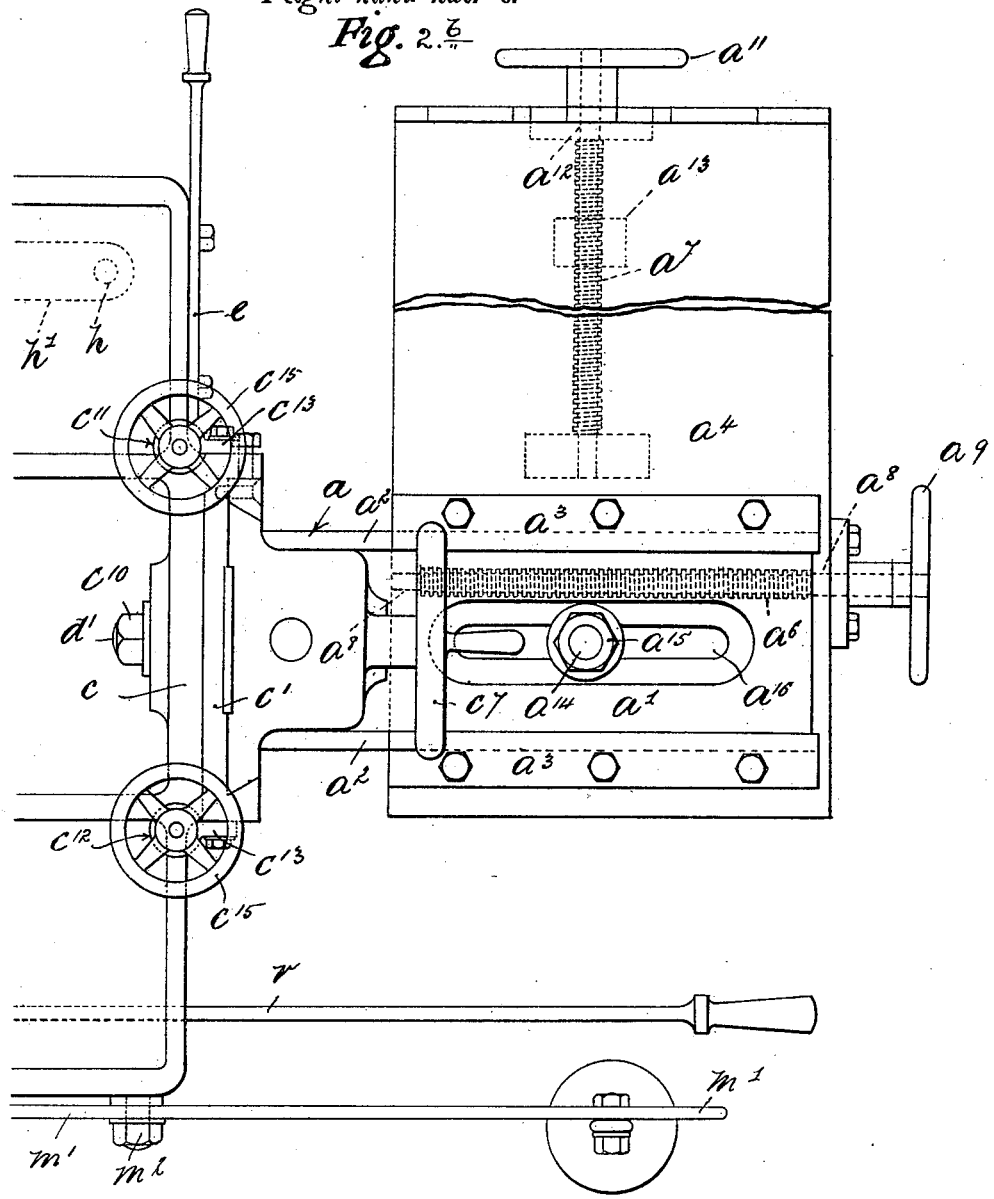
Figure 5:
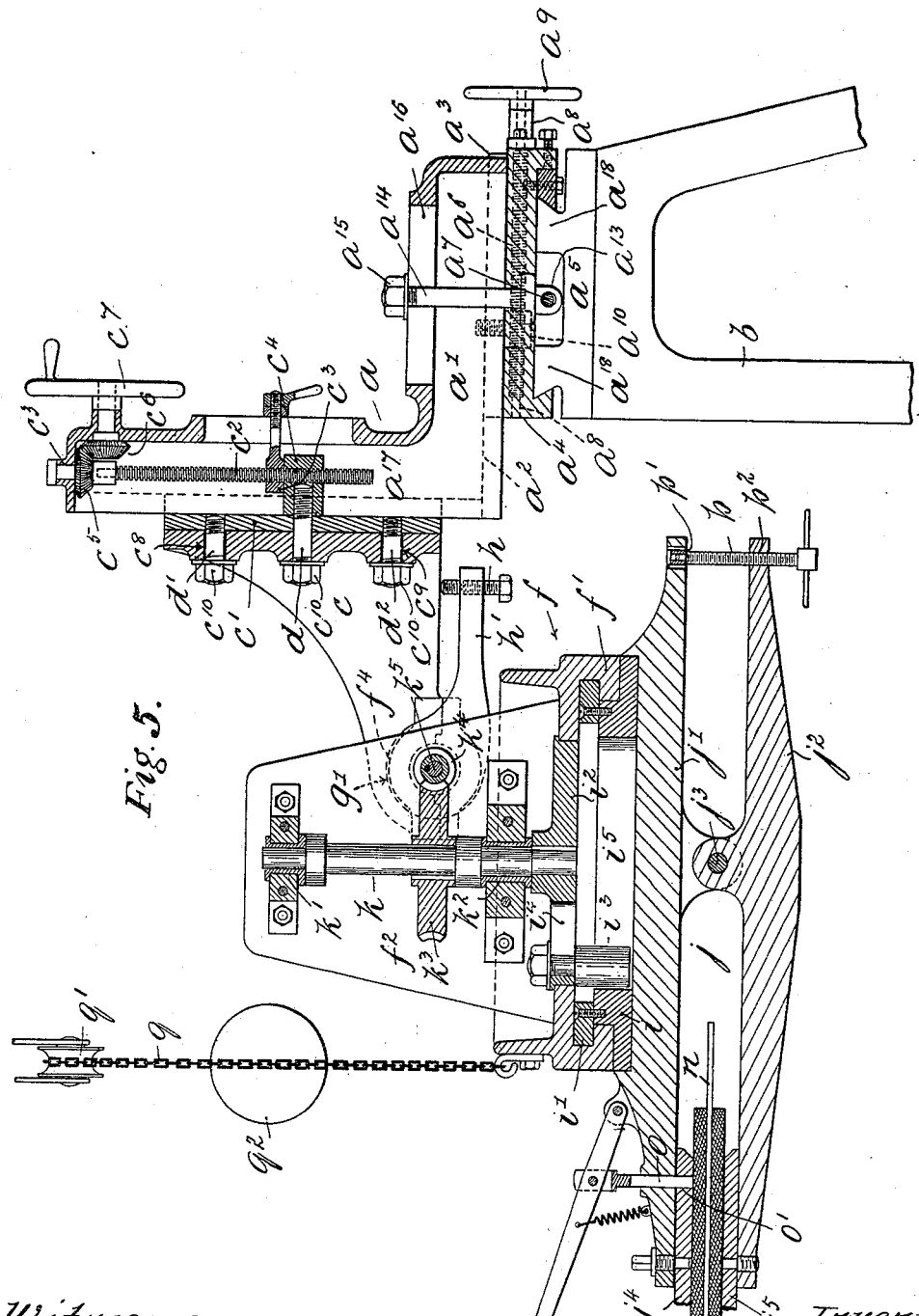

Figure 1 is a view in side elevation of the left side of a machine constructed in accordance with our invention. Fig. 1$^a$ is a similar view of the right side thereof. Fig. 2 is a top plan view of the side of the machine. Fig. 2$^a$ is a similar view of the right side thereof. Fig. 3 is a detail view in elevation illustrating the means for adjusting the bracket or hanger. Fig. 4 is a detail view illustrating the means for reciprocating the slide carrying the plate-clamps, and Fig. 5 is a vertical longitudinal sectional view of the complete machine.

The same letters of reference indicate corresponding parts in the several figures of the drawings.

$a$ is the support or body of the machine, consisting of an angular casting with the horizontal foot or base $a'$, having inclined edges $a^2$ and capable of sliding in the longer direction of the apparatus between a pair of undercut guides $a^3$, secured to an adjustable top or bed plate $a^4$, which is in turn capable of movement bodily along the transversely-disposed and stationary rest-frame $a^5$ in a direction at right angles to the direction of movement of the support $a$. The said rest-frame $a^5$ is rigidly supported by legs or standards $b$ and has disposed upon the top face of it a pair of guides $a^{18}$ for directing the movement of the bed-plate, while the adjustments in right-angled directions of the said support $a$ and bed-plate $a^4$ are respectively effected by screws $a^6 a^7$. The screw $a^6$, which is mounted in bearings $a^8$ in the adjustable bed-plate, has an operating hand-wheel $a^9$ at its outer end, and its wormed part takes through a screw-box $a^{10}$, secured to or formed within the base $a'$ of the support $a$, while the screw $a^7$, which is operated by a hand-wheel $a^{11}$, rotates in bearings $a^{12}$, secured to the stationary rest-frame $a^5$, and engages with a screw-box $a^{13}$, carried by the under side of the said bed $a^4$. The support $a$ is clamped in its adjusted position to plate $a^4$ by means of pin $a^{14}$, directed upward from the latter and through a longitudinal slot $a^{16}$ in the former, with its screwed upper end receiving the clamping-nut $a^{15}$.

$c$ is the bracket or hanger from which the slide-carriage and the driving-gear of the clamping-jaw slide is suspended or hung. It consists of a casting of suitable form and dimensions mounted so as to be capable both of vertical adjustment upon the upright arm $a^{17}$ of the support $a$ and of a rocking adjustment transversely to the length of the machine. To this end the body part of the bracket is carried upon a slide $c'$, mounted and guided upon the upright arm $a^{17}$ and vertically adjustable thereon, so as to alter the height of the bracket $c$ and parts hung from it relative to the support by means of a screw $c^2$, mounted in bearings $c^3$ in the said stationary arm and taking through a screw-box $c^4$, secured to the slide. The rotation of the said screw may be effected by a bevel-wheel $c^5$ upon it intergearing with another bevel-wheel $c^6$, in connection with the operating hand-wheel $c^7$ at the back of the arm or in any other convenient position. The radial or tilt adjustment of the said bracket relative to its support is effected by mounting it centrally upon a pin $d$, carried by the slide $c$, which is also provided, above and below the said center pin, with other pins $d' d^2$, respectively taking through curved slots $c^8 c^9$ in the back of the bracket and receiving nuts $c^{10}$ on their outer ends, which said pins and nuts form means for both guiding and limiting the movement of the bracket in its tilt adjustment and for locking the same in its set position after adjustment. The operation of tilting is effected by means of a pair of screws $c^{15}$, bearing against the bracket on opposite sides of its center and working through screwed eyes $c^{11}$ $c^{12}$ in suitable brackets $c^{13}$, made fast on the opposite sides of the slide $c'$, so that when the bracket is required to be tilted upon its center for the purpose hereinafter described the clamping-nuts $c^{10}$ are first slackened and then one of the adjusting-screws is raised clear of the edge of the bracket to an extent corresponding to the degree of tilt to be given, after which the said bracket (and all the parts of the apparatus carried by it) is rocked bodily by depressing the other screw. The said screws $c^{15}$ further serve as steadying-pins for the bracket, while in order to facilitate the tilting of the bracket the same may be provided with a conveniently-disposed auxiliary handle $e$, by which the said adjustment may be effected independent of the screws.

$f$ is the carriage for the slide carrying the glass-clamping jaws and its belt-operated driving-gear. It consists of an open rectangular framing $f'$ of suitable dimensions, having bolted to or formed upon the opposite top sides of it a pair of secondary brackets $f^2$ $f^3$, respectively provided with trunnions or journals $f^4$ $f^5$, taking within sleeved bearings $g'$ $g^2$ at the opposite ends of the bracket $c$ in such a manner that the said carriage $f$ is capable of swinging or rocking longitudinally on its bearings in the said bracket, the extent of such swinging movement being limited and the beveling of the edges of a glass plate controlled, as hereinafter more fully described, by means of a set-pin $h$, carried by and adjustable within an arm $h'$, made fast to one of the trunnions or any other suitable part of the rocking carriage and impinging against a contiguous part of the relatively-fixed bracket.

The space within the carriage $f$ is provided with suitable guides $i'$, upon which a slide, such as $i$, carrying the glass-clamps $j$, is compelled to make a rectilinear traversing movement by means of a crank-plate $i^2$ or equivalent arrangement provided with a rollered or other stud $i^3$, adjustable within a slot $i^4$ for the purpose of varying the stroke of the slide and engaging in a longitudinal race $i^5$ in the said slide. The necessary rotary movement may be imparted to the said crank plate or disk through a vertical shaft $k$, mounted in bearings $k'$ $k^2$ on the inside of the secondary hanger bracket $f^2$, and provided with a worm-wheel $k^3$, gearing with a worm $k^4$ on a counter-shaft $k^5$, which may run through the trunnion-mountings $f^4$ $f^5$ (formed as sleeves for the purpose) of the carriage and through their bearings in the bracket and has at one end of it a pulley $k^6$, driven by means of a band $k^7$ from suitable overhead or other shafting. The said band is automatically kept tight, whatever may be the position of the bracket $c$, by running it over a freely-rotating drum or pulley $m$, carried at one end of a counter-poised or weighted beam $m'$, fulcrumed at $m^2$ to one side of the said bracket.

The glass-clamps $j$ consist of a pair of arms $j'$ $j^2$, the former of which may be made fast to the under side of the slide $i$ and has the other arm jointed to it at $j^3$. $j^4$ $j^5$ are the clamps which hold the piece of glass $n$ under operation and which may be of any suitable construction, but preferably having an auxiliary spring-controlled plunger, such as $o$, adapted to engage with one or the other of a series of holes $j^6$ in the top grip to hold the glass in different determined positions when under operation, while the clamping ends of the arms are closed and opened by means of a screw $p$, with one end swiveling at $p'$ in the rear extension of the fixed jaw-arm and the other and wormed part passing through a screw-box $p^2$ in the rear end of the other and jointed arm.

To partly balance the weight of the trunnioned slide-carriage, which would otherwise be borne only by the glass under treatment, we suspend or hang the same at the front end from one or more chains, such as $q$, running over suitable supported pulleys, such as $q'$, and having a weight $q^2$ at its free end, whereby glass plate under treatment is only required to support such part of the weight of the carriage as may be necessary for automatically following up the grinding cut of the mill in beveling or shaping. It will thus be understood that the weight of the partly-balanced and trunnion-mounted slide-carriage operates to keep the glass under treatment up to the surface of the grinding stone or mill or polishing-drum, as the case may be, across or along which the said glass is made to reciprocate or traverse to and fro by the rectilinear movement imparted to the jaw-slide through the rotation of the crank-plate or its equivalent through the band-driven gearing, and that when grinding the cut is automatically followed up as the grinding proceeds, from the fact that the carriage is free to rock upon its trunnion-bearings in the bracket, and, further, that the extent of such beveling is regulated and overgrinding is prevented by the previously-adjusted set-pin $h$, carried by an extension of the said rocking carriage impinging against its abutment on the bracket and blocking the carriage against further movement downward toward the grinding-face of the mill. The rocking of the slide-carriage in the opposite direction to take the glass away from the mill to facilitate its removal or the like may be effected by a handle or lever $r$, bolted to one side of the frame. It will also be understood that the transverse and longitudinal adjustment of the carrier-frame $a$ along and across the bed-plate $a^4$ and the vertical adjustment of the bracket $c$ upon the upright arm of the said frame $a$ are for the purpose of setting the clamping-jaws in a suitable position relative to the grinding-surface. The longitudinal adjustment of the carrier-frame with the vertical adjustment of the bracket and slide-carriage and parts carried by them is also provided for the purpose of setting them in the proper positions relative to the polishing or finishing drum when polishing the beveled or ground surfaces of a glass plate after the initial or rough grinding has been effected on the grinding-mill, while the transverse-tipping adjustment of the bracket, with slide-carriage, driving-gear, and clamps, across the face of the support $a$ is for the purpose of setting the edges of the glass plates in a suitable position relative to the flat grinding-surface for grinding off corners or producing plates of different shapes.

Having fully described our invention, what we desire to claim and secure by Letters Patent is—

1. In a machine of the character described, the combination with a vertically-adjustable bracket or support, of a swinging carriage hinged to the bracket or support, a reciprocating slide mounted in the carriage, clamps carried by the slide for holding the glass to be operated on, and driving mechanism carried by the carriage for reciprocating the slide, substantially as described.

2. In a machine of the character described, the combination with a vertically-adjustable bracket, and means for adjusting said bracket laterally about its center, of a swinging carriage hinged to the bracket, means for partially balancing the carriage, a reciprocating slide mounted in the carriage and provided with means for holding the glass to be operated on, a rotatable crank-plate provided with a stud engaging a slot in the slide, and means for rotating the crank-plate for imparting a rectilinear reciprocating movement to the slide, substantially as described.

3. In a machine of the character described, the combination with a vertically-adjustable bracket and means for adjusting said bracket laterally about its center, of a swinging carriage hinged to the bracket, an arm fixed on the carriage, a set-screw adjustably fitted in the end of said arm and engaging a fixed abutment to adjustably limit the swinging movement of the carriage, a reciprocating slide mounted on the carriage, means carried by the carriage for holding the glass to be operated on, and means for reciprocating the slide.

4. A machine for beveling or shaping glass plates by grinding and finishing the ground surfaces, comprising a longitudinally and transversely adjustable support, a bracket having a vertical and transverse tilt adjustment upon the said support, a forwardly-swinging carriage having trunnions mounted in bearings in the said bracket, a set-pin adjustable in an extension of the said carriers and adapted to limit its downward swing, a slide having a rectilinear traverse within guides in the said carriage, a pair of glass-clamps carried by and moving with the said slide, and gearing for operating the crank-plate by which the said slide is traversed substantially as and for the several purposes herein described and set forth.

5. In a machine of the character described, the combination of a longitudinally and transversely adjustable support, a bracket having a vertical and transverse tilt adjustment upon the support, a forwardly-swinging carriage provided with hollow trunnions mounted in bearings in the bracket, guides on the carriage, a slide arranged to move in a rectilinear direction within said guides, clamps carried by the carriage for holding the glass to be operated on, a worm-shaft journaled in the hollow trunnions, a vertical shaft mounted in the bracket, a worm-wheel fixed on said shaft and meshing with said worm-shaft, a crank-plate fixed on the shaft and provided with a stud engaging a slot in the slide, and a band and pulleys for driving the worm-shaft to reciprocate the slide, substantially as described.

6. In a machine of the character described, the combination of a longitudinally and transversely adjustable support, a bracket having a vertical and transverse tilt adjustment upon the support, a forwardly-swinging carriage provided with hollow trunnions mounted in bearings in the bracket, guides on the carriage, a slide arranged to move within said guides, clamps carried by the carriage for holding the glass to be operated on, a worm-shaft journaled in the hollow trunnions, a vertical shaft mounted in the bracket, a worm-wheel fixed on the vertical shaft and meshing with said worm-shaft, a crank-plate fixed on the shaft and provided with a stud engaging a slot in the slide, a belt and pulleys operating to drive the worm-shaft to reciprocate the slide, and a belt-tightener to keep the belt under operative tension under the different adjustments of the bracket, comprising a weighted arm fulcrumed intermediate its ends and provided at one end with a pulley over which the belt runs, substantially as described.

In testimony whereof we have hereunto set our hands in presence of two subscribing witnesses.

EDWARD HENRY PEARCE.
ALFRED GRIFFITHS.

Witnesses:
HENRY SKERRETT,
ARTHUR T. SADLER.